June 13, 1967  S. W. HOARE  3,324,972
LUBRICANT SUPPLY DEVICE
Filed Nov. 27, 1964
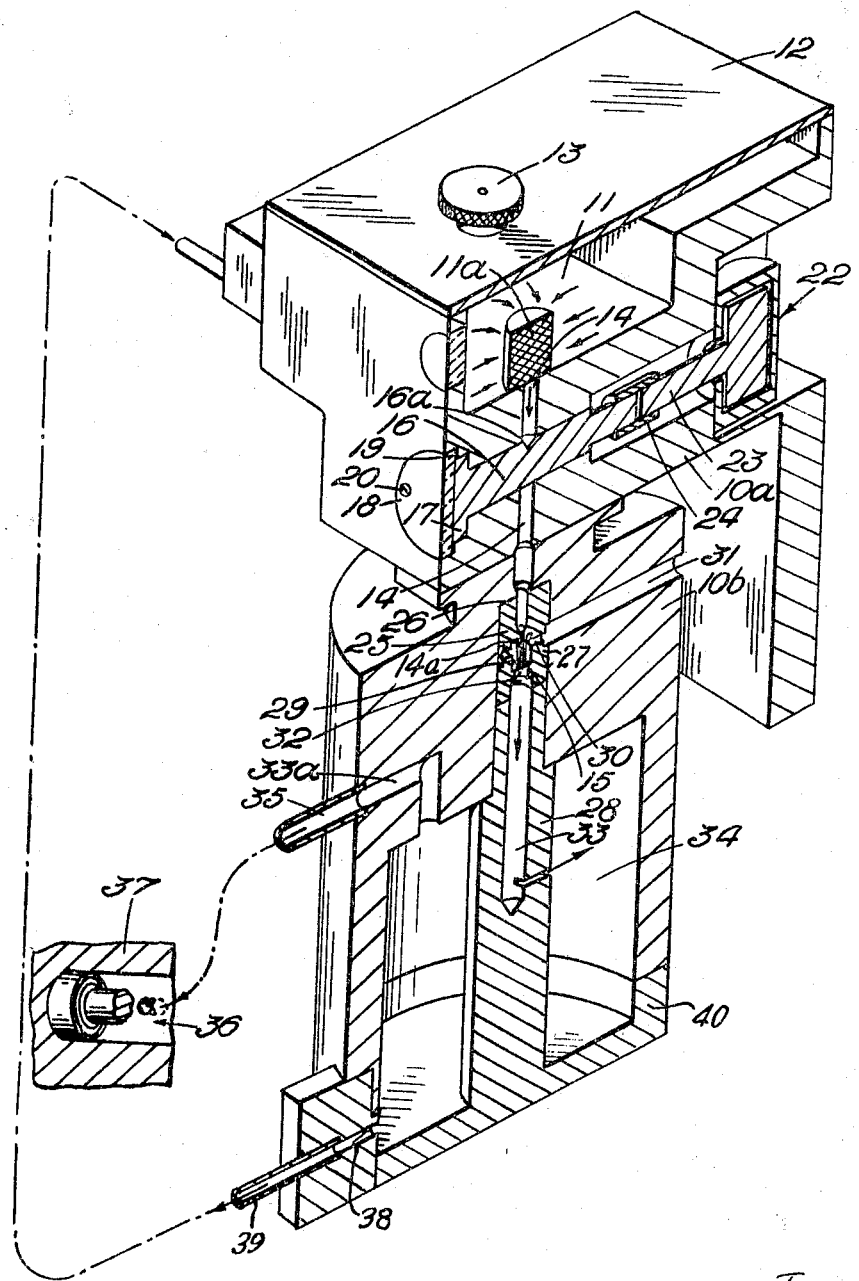
INVENTOR
Stanley Wm. Hoare
By Watson, Cole, Grindle & Watson
ATTORNEYS

3,324,972
LUBRICANT SUPPLY DEVICE

Stanley William Hoare, Peterborough, England, assignor to The Newall Engineering Company Limited, Peterborough, England, a British company
Filed Nov. 27, 1964, Ser. No. 414,118
8 Claims. (Cl. 184—56)

This invention relates to lubricant supply devices and has a particularly useful but not exclusive application where accurately measured quantities of lubricant mist are to be supplied to precision bearings.

According to this invention there is provided a lubricant supply device comprising a body which provides a reservoir for lubricant and an outlet passage through which lubricant can leave the reservoir under gravity and which terminates in an outlet aperture, a member mounted in the body and blocking said outlet passage, said member having in its surface a depression which in one position of the member opens to the reservoir and is out of communication with the outlet aperture and in another position of the member opens to the outlet aperture and is out of communication with the reservoir, means for directing an airflow past the outlet aperture for converting at least part of the lubricant which flows through the outlet aperture to a mist, and an outlet duct for the oil mist leaving the outlet aperture. The member is preferably disposed intermediate the ends of said outlet passage. The member is preferably also adapted to rotate unidirectionally between the two said positions.

In preferred constructions the rotary member is constituted by a shaft which extends across the passage. A sight glass may be mounted in the body in alignment with the shaft to enable the rotation of the shaft to be observed.

According to a feature of the invention a chamber is formed in the body intermediate the ends of said duct, and acts as a trap for any lubricant not converted to mist. A duct is preferably provided for leading liquid lubricant from the chamber back to the reservoir.

The invention also provides the combination with a machine having at least one bearing of a lubricant supply device as set forth in any of the preceding clauses, said duct extending to the bearings or each bearing.

One embodiment of the invention will now be described by way of example with reference to the accompanying drawing which shows a sectioned perspective view of the lubricating device.

Referring to the drawing the body of the lubricating device comprises an upper part 10a and a lower part 10b. The body part 10a provides a reservoir 11, and a lid 12 for the reservoir is secured to the body. The lid has an aperture to enable the reservoir to be filled, and a screw-threaded plug 13 is engaged in the aperture and has a small hole in it for venting the reservoir to atmosphere. A passage 14 extends downwards from the bottom of the reservoir through body part 10a into body part 10b and terminates in an outlet aperture 15.

The passage 14 is blocked by a rotary shaft 16 which extends at right angles to the passage and which is carried in a bore in the body part 10a. The shaft has a head 17 at one end which is accommodated in a counterbore. A transparent sight glass 18 and an annular sealing washer 19 are secured by screws 20 in a rebate round the counterbore, so that the rotation of the head of shaft 16 can be observed. The head 17 of the shaft may have a mark thereon to facilitate observation of the speed of rotation.

An electric motor 22 is secured to the body 10 by screws and the output spindle 23 of the motor is disposed coaxially with and is drivingly coupled to shaft 16 by a coupling 24.

Opposite the passage 14, the shaft has a pocket or depression 16a in its surface which opens alternately to the reservoir 11 and the outlet aperture 15 as the shaft rotates. When the depression opens to the reservoir it is out of communication with the outlet aperture and vice versa. When shaft 16 is rotated by motor 22, a drop of lubricant is carried from the reservoir in the depression 16a at each revolution of the shaft and is deposited in a part of the passage 14 whence it can flow under gravity to the outlet aperture 15.

Outlet aperture 15 is formed at the lower end of a narrow portion 14a of passage 14, and outlet aperture 15 and passage portion 14a are formed in a plug 25 which is held against a shoulder 26 in a bore 27 in body part 10b by the upper hollow end of a column 28.

An annular space 29 in the plug encircles passage portion 14a and communicates through radial passages 30 and an annular channel on the external surface of the plug with an air passage 31 in the body portion 10b. Compressed air from an external constant-pressure source is supplied to passage 31 and flows thence into annular space 29, through a venturi passage 32 in the plug and into an outlet duct 33. The outlet aperture 15 is disposed at the upstream end of the venturi passage and lubricant from the aperture 15 becomes entrained with the air flowing at high speed through the venturi, a proportion of the lubricant being converted into a mist by the turbulence. The resulting oil mist passes through duct 33, an annular chamber 34, a continuation 33a of the duct 33 and an outlet pipe 35 to a precision bearing 36 in a machine tool 37 such as a jig borer or a grinding machine. Any large drops of lubricant fall into the bottom of chamber 34 and when the level rises to that of a passage 38 formed in a block secured to the body, any lubricant in passage 38 is forced by the air pressure in the chamber along a pipe 39 leading back to the reservoir 11, which is vented to atmosphere through its plug 13. The bottom portion of chamber 34 is afforded by an annular member 40 with which column 28 is integrally formed, and the member 40 mates with and is secured to the body part 10b, such that chamber 34 is airtight.

It has been found to be of critical importance, where ultra-precision bearings for high-speed spindles are employed, that the amount of oil mist supplied should be accurately controlled.

The above construction was found to be capable of delivering an even and accurate amount of lubricant mist to the bearing, the amount of mist delivered being dependent on the speed of the motor 22. Where the rate of drip feeding by shaft 16 is required to be variable motor 22 may be a variable speed D.C. motor, but where the required rate of drip feeding is constant, the motor may be a synchronous motor.

I claim:
1. A lubricant supply device comprising a body which provides a reservoir for lubricant and an outlet passage through which lubricant can leave the reservoir under gravity and which terminates in an outlet aperture, a rotary member mounted in the body and blocking said outlet passage, said member having in its surface a depression which in one position of the member opens to the reservoir and is out of communication with the outlet aperture and in another position of the member opens to the outlet aperture and is out of communication with the reservoir, motor means for driving the rotary member, means for directing an air flow past the outlet aperture for converting at least part of the lubricant which flows through the outlet apertures to a mist, and an outlet duct for the oil mist leaving the outlet aperture.

2. A device as claimed in claim 1 wherein the rotary member is disposed intermediate the ends of said outlet passage.

3. A device as claimed in claim 1 wherein the rotary member is adapted to rotate unidirectionally between the two said positions.

4. A device as claimed in claim 3, wherein the rotary member is constituted by a shaft which extends across the passage.

5. A device as claimed in claim 4 wherein a sight glass is mounted in the body in alignment with the shaft to enable the rotation of the shaft to be observed.

6. A device as claimed in claim 1 wherein a chamber is formed in the body intermediate the ends of said outlet duct, said chamber serving as a trap for any lubricant not converted to mist.

7. A device as claimed in claim 6, further comprising a second duct for leading liquid lubricant from the chamber back to the reservoir.

8. In combination, a machine having at least one bearing and a lubricant supply device as claimed in claim 1 for lubricating said bearing wherein said outlet duct of said lubricant supply device extends to said bearing.

References Cited

FOREIGN PATENTS

| | | |
|---|---|---|
| 147,782 | 8/1952 | Australia. |
| 116,970 | 7/1918 | Great Britain. |
| 28,293 | 12/1908 | Great Britain. |

LAVERNE D. GEIGER, *Primary Examiner.*

H. S. BELL, *Assistant Examiner.*